United States Patent [19]

Koepf

[11] 4,446,556
[45] May 1, 1984

[54] OFF-AXIS COHERENTLY PUMPED LASER

[75] Inventor: Gerhard A. Koepf, Seabrook, Md.

[73] Assignee: The United States of America as represented by the Administrator of the National Aeronautics and Space Administration, Washington, D.C.

[21] Appl. No.: 199,766

[22] Filed: Oct. 23, 1980

[51] Int. Cl.³ .......................... H01S 3/05; H01S 3/08; H01S 3/094

[52] U.S. Cl. ........................................ 372/4; 372/71; 372/93; 372/95; 372/103

[58] Field of Search ..................... 372/71, 103, 93, 95, 372/98, 99, 4, 108

[56] References Cited

U.S. PATENT DOCUMENTS

| | | | |
|---|---|---|---|
| 3,503,671 | 3/1970 | Kompfner | 372/103 |
| 3,928,816 | 12/1975 | Hartwick et al. | 311/94.5 |
| 3,996,527 | 12/1976 | Hernqvist | 372/108 |

OTHER PUBLICATIONS

Koepf et al, "Design Criteria for FIR Waveguide Laser Cavities", IEEE J. of Quantum Electronics, vol. QE-13, No. 6, Jun. 1977, pp. 418-421.

Primary Examiner—James W. Davie

Attorney, Agent, or Firm—Ronald F. Sandler; John R. Manning; John O. Tresansky

[57] ABSTRACT

Disclosed is a coherently optically pumped laser system wherein a pump laser beam (30) propagates through a laser medium contained in a degenerate cavity resonator (10) in a controlled multiple round trip fashion in such a way that the unused pump beam (30') emerges from an injection aperture (24) at a different angle ($\beta$) from which it enters ($\alpha$) the resonator. The pump beam (30) is angularly injected off of the central axis (22) of the resonator body (10) whereupon the pump beam alternately undergoes spreading and focusing ($b_1 \ldots b_8$) while pumping the laser medium by a process of resonant absorption pumping. Means (32) are employed externally of the cavity resonator to sense the emergent output beam (30') which is used not only for alignment of the system but also to monitor the power of the emergent pump beam. The power in the emergent pump beam (30') provides a measure of the performance of the laser systems. The emergent output beam (30') thus is not fed back along the same path as the incident pump beam (30), thereby eliminating feedback to the pump beam source (28). The emergent pump beam (30') can also be used as a second pump beam source (30") by being reinjected back into the cavity or it can be used for pumping another laser (50).

14 Claims, 7 Drawing Figures

OFF-AXIS COHERENTLY PUMPED LASER

ORIGIN OF THE INVENTION

The invention described herein was made in performance of work under a NASA contract and is subject to the provisions of Section 305 of the National Aeronautic and Space Act of 1958, Public Law 85-568 (72 Stat. 435; 42 U.S.C. 2457).

TECHNICAL FIELD

This invention relates generally to laser apparatus and more particularly to a coherent optically pumped gas laser system.

BACKGROUND ART

The present invention has particular utility in laser systems wherein optical energy of a first wavelength is utilized to pump a gaseous laser medium for producing a CW output beam whose light energy is of a second wavelength.

A large number of molecular gases are known to produce gain in the sub-millimeter frequency spectrum (far infrared or FIR) on rotational transitions of excited vibrational modes at low pressures. The current technique of exciting these molecules from a ground vibrational-rotational level to a higher vibrational-rotational level is by coherent optically pumping the laser medium by another laser, typically a carbon dioxide ($CO_2$) laser, inasmuch as the spectrum lines produced thereby overlap with the vibrational-rotational transitions of the gaseous medium and thus provide the necessary selective excitation, whereby resonant absorption pumping takes place. For achieving continuous (CW) operation of these optically pumped sub-millimeter lasers, the molecular gas pressure must be lowered to such an extent that the rotational thermalization and the vibrational translational energy exchange between the molecules are in a certain balance. At these pressures, the absorption coefficients of the laser gases are relatively low and accordingly it takes a long interaction length of the pump laser beam with the sub-millimeter laser gas for efficient use of the available pump power. Since it's practically inconvenient to build sub-millimeter laser resonators having a length in the order of 10 to 30 meters, resonators typically having a length in the order of 1 to 3 meters in length are generally utilized with the pump beam being injected through a hole in the center of one of the end mirrors which then propagates in an ever expanding uncontrolled mode back and forth between the two resonator mirrors.

In a conventional design of an optically pumped sub-millimeter (FIR) laser resonator an on-axis aperture or injection hole is provided in one of the end mirrors for coupling of the pump laser beam into the resonator. In such a configuration, a substantial part of the pump power is lost in the walls of the circular laser tube which acts as an over-size waveguide. Also, at each reflection off the end mirror having the injection hole, a part of the pump laser beam escapes from the resonator and propagates back on the same axis as the input pump beam, providing a feedback to the pump laser. Since the feedback radiation is arbitrarily in phase with the pump laser field, it operates to pull the cavity mode frequency of the pump laser. Frequency changes in the pump laser, in turn, cause frequency changes and changes in the absorption coefficient of the laser being pumped. Thus, the conventional design of optically pumped sub-millimeter lasers inherently provides an unstable source of radiation that fluctuates in power and frequency.

Thus pump beam feedback and the pump laser resonances constitute a known problem in the design of sub-millimeter lasers. Both effects are responsible for substantial instabilities and both effects are caused by the uncontrolled propagation of the pump laser beam in the sub-millimeter laser resonator.

In the past, several approaches have been proposed for overcoming the feedback problem. One approach well known in the field of optics is to suppress reflections of laser beams by the use of an isolator. Optically such a device may be implemented by inserting a quarter wave plate and a polarizer in series into the laser beam. Another approach has been to use a polarizer and a Faraday rotating crystal. Still another approach uses an acoustic or optical crystal in the path of the laser beam.

While these attempts have been more or less successful, basic limitations nevertheless still exist since they require the use of elements in the path of the relatively high power pump laser beam and each element introduces losses thereto. Additionally, since these elements generally rely on positioning in a waist region, i.e. a region of minimum cross section of the pump laser beam, additional focusing elements are generally necessary to produce another beam waist region at the position of the injection hole. Also, the pump power absorbed by these elements generates heat that reduces their functional performance.

STATEMENT OF THE INVENTION

Accordingly, it is an object of the present invention to provide apparatus for obviating pump beam feedback in an optically pumped laser.

Another object of the present invention is to provide apparatus for optimizing the pump radiation absorption in an optically pumped laser.

Yet another object of the present invention is to provide an optically pumped laser system wherein a reflected pump beam can be reused.

Still another object of the present invention is to provide an optically pumped laser system whereby the operation of the system can be monitored by means of a reflected pump beam.

And still another object of the present invention is to provide an optically pumped laser system whereby resonator alignment can be effected by monitoring a reflected pump beam.

These and other objects are achieved by means of a coherent optically pumped gaseous laser system where the pump laser beam is injected offset and angularly oriented with respect to the central axis of a degenerate laser cavity resonator whereby, following multiple round trip reflections from the resonator end mirrors in a controlled propagation mode, the pump beam emerges at a different angle with respect to the injection beam thereby preventing any feedback of the pump laser beam to the pump source. Additionally detector means are located in the path of the emergent pump beam for monitoring the emergent beam which can be used not only for monitoring the performance of the laser itself but also to adjust the resonator axial alignment. The emergent pump beam can also be used for other purposes such as pumping another laser or even for being reinjected as a second input pump beam into the cavity resonator.

These and other objects of the present invention will become more fully apparent to those skilled in the art in the course of the following description considered in conjection with the drawings.

DETAILED DESCRIPTION OF THE INVENTION

Figure 1:
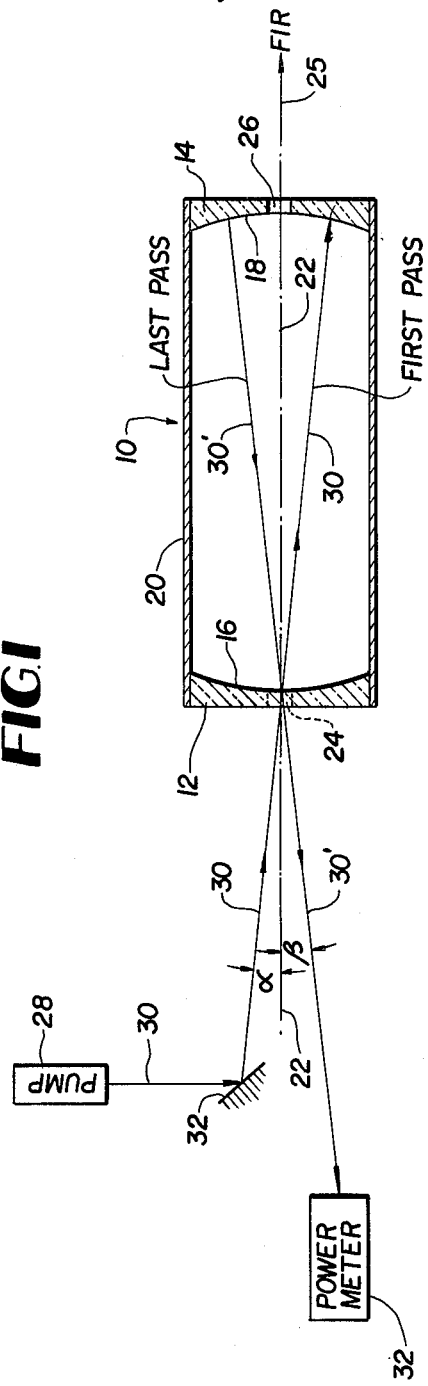
FIG. 1 is a schematic diagram illustrative of a first embodiment of the subject invention.

Referring now to the drawings and more particularly to FIG. 1, shown therein is a schematic representation of an optically pumped laser configuration adapted to provide a CW output laser beam in the sub-millimeter range (far infrared or FIR) of the optical spectrum and one which involves the use of a degenerate cavity having off-axis pump beam injection. This type of apparatus has been described in a publication entitled, "Design Criteria For FIR Waveguide Laser Cavities" by G. A. Koepf et al. which appeared in the IEEE Journal of Quantum Electronics, Vol. QE-13, No. 6, June, 1977 at pp. 418-421. This publication is herein incorporated by reference and discloses, for example, that a degenerate optical resonator is a cavity in which plural sets of degenerate transverse modes having identical resonant frequencies are possible. By coupling of a coherent pump beam into the cavity so as to make successive passes within the cavity by being reflected off of reflective end mirrors, resonant absorption pumping occurs whereby energy is absorbed from the pump beam to cause excitation of the laser medium. By displacing the coupling aperture from the central longitudinal axis of the cavity, a more efficient coupling arrangement is obtained for a limited number of round trips of the pump beam within the cavity. Since long interaction length of the pump radiation with the laser medium is required to enhance pumping, degenerate cavities provide this need.

Figure 2B:
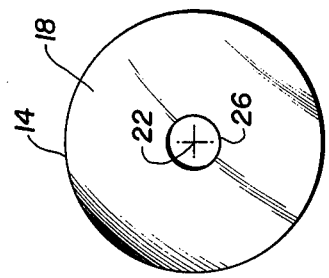
FIGS. 2A and 2B are end planar views of the mirrors located at opposite ends of the laser cavity resonator shown in FIG. 1.
Figure 2A:
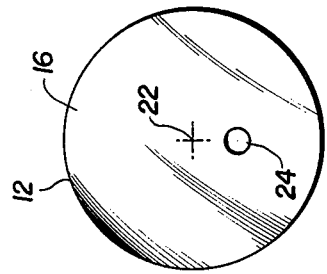

Accordingly, reference numeral 10 of FIG. 1 denotes a degenerate cavity resonator comprised of conventional end mirrors 12 and 14, each having highly reflective inner surfaces 16 and 18 coated with gold, for example, whereby, as noted in the Koepf, et al. publication, the degree of degeneracy is determined by their radii of curvature and the cavity length which is established by the distance between the surfaces 16 and 18. A gaseous laser medium e.g. a vapor of formic acid, not shown, adapted to generate a sub-millimeter FIR output beam, is located within the cavity body 20 which is in the form of circular waveguide fabricated, for example, from glass tubing. Reference numeral 22 designates the central longitudinal axis of the resonator body 20. As shown in FIG. 2A, the end mirror 12 includes an off-axis pump beam input aperture or injection hole 24 while the other mirror 14, as shown in FIG. 2B, includes a relatively larger on-axis output aperture 26 for the output of a FIR laser beam 25, which is produced in a CW mode as a result of resonant absorption pumping supplied by an external source 28 shown in FIG. 1.

Further, FIG. 1 is intended to represent a top plan view of a first embodiment of the subject invention. There a pump source 28, preferably constituting a $CO_2$ laser, generates a micrometer output beam 30 which is reflected off of a mirrored surface 32 and injected at an angle $\alpha$ with respect to the central longitudinal axis 22 into the laser resonator body 20 via the offset injection hole 24. By making the inner reflecting surfaces 16 and 18 curved, the first pass of the incident beam 30 is reflected from the surface 18 back to the surface 16 and the pump beam thus will be reflected back and forth between the end mirrors several times, alternately being spread and focused, as will be shown. By making the radii of curvature of the two surfaces 16 and 18 equal, after a predetermined number of passes or round trips depending upon the length of the cavity housing 20, the last pass from the surface 18 will be focused to a minimum cross section or waist region where it will emerge from the end mirror 12 at the injection hole 24 as beam 30' and at an angle $\beta$ with respect to the longitudinal axis 22, meaning that the incident pump beam 30 and the emergent pump beam 30' are skewed with respect to one another and wherein angles $\alpha = \beta$.

Figure 5:
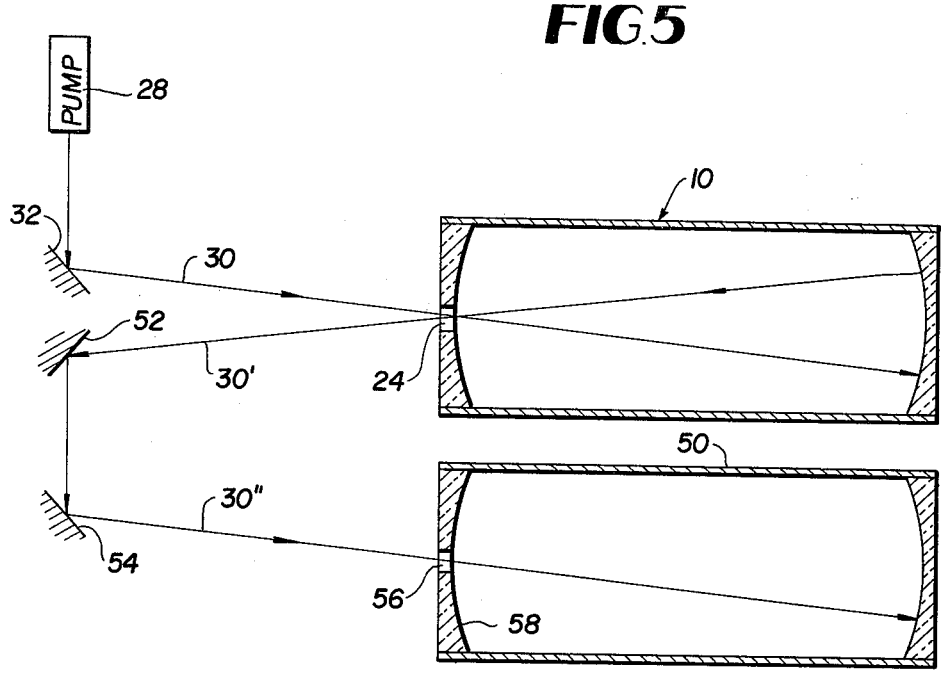
FIGS. 5 and 6 are schematic diagrams illustrative of second and third embodiments of the subject invention.
Figure 6:
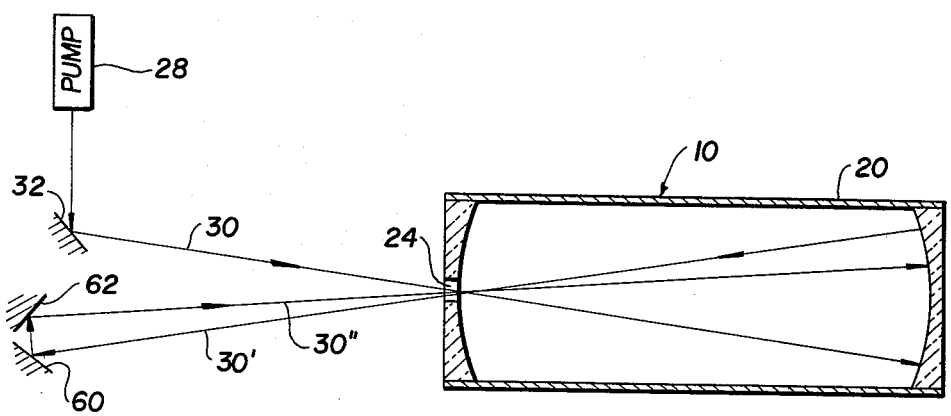

This angular relationship is significant in that no laser pump feedback to the pump laser 28 occurs, meaning that none of the emergent beam 30' energy is directed back into the path of the incident pump beam 30. This operation is significant in that no interference of pump waves traveling in the two directions occur and therefore the sensitivity of the resonator to pump frequency resonances is completely eliminated. Inasmuch as the emergent pump beam 30' has a path which is angulated with respect to the incident pump beam 30, a detector 32, shown in the form of a power meter, is placed in the path of the emergent pump 30'. The power meter 32 acts as a means for monitoring system operation in that: (a) both power and frequency changes of the pump laser 28 can be directly detected thereby; (b) laser gas pressure changes are readily observable as changes in the reflected pump power; and (c) the emergent pump beam 30' provides an indication of resonator alignment and can be used in initial set up by positioning the power meter at the proper location and then proceed with alignment until a peak reading of the pump beam output is observed. The output pump beam 30' emerging from the injection hole 24 can also be used for other purposes such as pumping a second optically pumped laser, as shown in FIG. 5, or it could be redirected and injected once again into the same injection hole 24 as shown in FIG. 6 for achieving yet higher efficiency.

Figure 3:
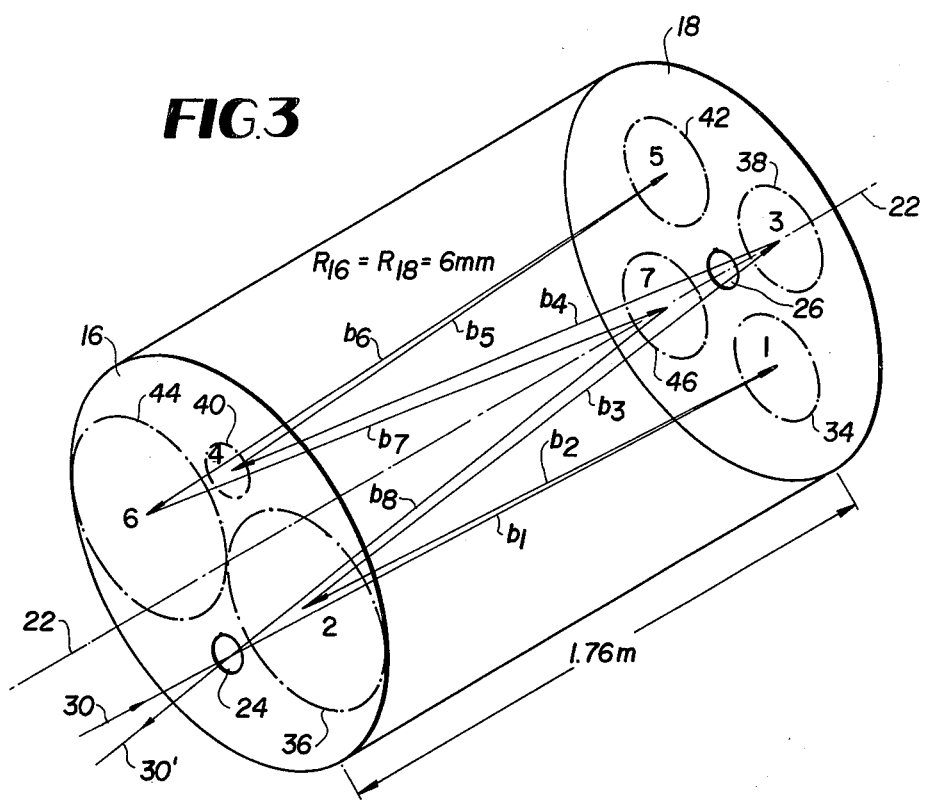
FIG. 3 is a diagram illustrative of the multiple round trip travel of the pump laser beam in a fourfold degenerate cavity wherein alternate spreading and focusing of the pump beam occurs.

In order to provide a better understanding of the controlled pump propagation in the degenerate cavity formed by the mirrors 12 and 14 and body 20 of FIG. 1, reference is now made to FIG. 3 wherein there is shown a configuration whereby the optics of the laser resonator 10 and its length are chosen to provide a fourfold degenerate resonator. Typically, such a configuration is provided where the radius of curvature of the curved mirror surfaces 16 and 18 of the end mirrors 12 and 14 shown in FIG. 1 are substantially equal and being of a magnitude of 6 m and wherein the separation of distance therebetween is substantially 1.76 meters. The resonator body 20 is formed from 38 mm ID glass tube protected by a steel casing, not shown. By locating the injection hole 24 at substantially one half the mirror radius from the center axis 22, the input beam 30 enters the cavity angularly off the central axis 22 where it will undergo four round trips while undergoing alternate spreading and focusing without any overlap of the vertices and emerging from the injection hole 24 at the completion of the eighth pass as a beam waist i.e. a region of minimum cross-sectional diameter. As shown in FIG. 3, the pump beam during the first pass comprises the beam $b_1$ which expands to the region 34 on the surface 18 where it is reflected as beam $b_2$ and where it expands still further to the region 36, completing one round trip. Upon being reflected from the region 36 as a beam $b_3$, a focusing effect occurs according to the well known principles of optics as it relates to curved mirrors, whereupon it strikes the region 38 on reflecting surface 18. A reflected beam from region 38 is further focused as a beam $b_4$ where it strikes the region 40 as a beam waist which is located at a one-half mirror radius on the other side of the central axis 22. Two round trips have thus been completed. The beam thereafter expands as beam $b_5$ to the region 42 on mirror surface 18 where it is reflected as beam $b_6$ and where it further expands to the region 44. A refocusing next takes place wherein the reflected beam $b_7$ is directed to the region 46 where it is further focused and redirected as beam $b_8$ to the injection hole 24. As is known, the degeneracy can also be defined in the number of round trips the pump beam makes within the resonator body 20 and thus it can be seen with reference to FIG. 3 that a fourfold degeneracy is effected. Further, if the measure of degeneracy is divisible by four, the vertices of beams $b_1 \ldots b_8$ lie on a circle of the reflective mirrors 16 and 18 having a center located at the central longitudinal axis 22 of the resonator.

Figure 4:
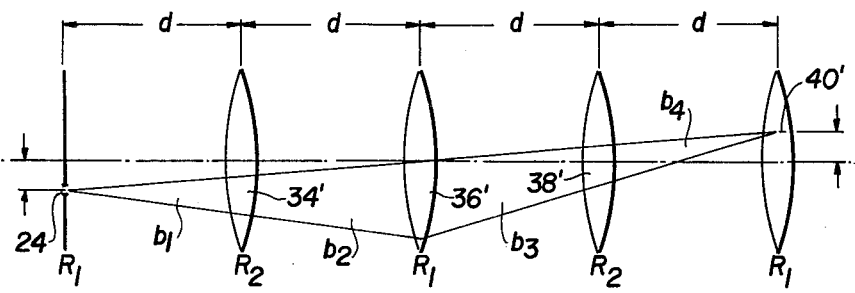
FIG. 4 is a diagram helpful in understanding the optical principles involved in spreading and focusing of the laser pump beam as shown in FIG. 3.

Referring now to FIG. 4, there is illustrated the manner in which an optical beam is first expanded and then focused in two round trips of the resonator depicted in FIG. 3 into a periodic sequence of lenses $34'$, $36'$, $38'$ separated by a distance d. These lenses represent the curvature regions 34, 36, 38 and 40 shown in FIG. 3. It can be seen, therefore, that the beams $b_1$ and $b_2$ are expanded while the beams $b_3$ and $b_4$ are being focused to a point on the other side of the center line 22. Thus, in the process of making four round trips, the pump beam will reach a beam maximum and a beam waist or minimum value twice with the last minimum value occurring at the injection hole 24. While a fourfold degeneracy configuration is shown wherein four round trips of a pump beam are provided, any multiple of four round trips can be utilized as long as there are no beam vertices which overlap so as to coincide with the input beam and having a direction in direct opposition thereto.

In such an arrangement, there is no pump power feedback into the pump laser and there are no standing waves of pump radiation built up in the resonator so that as a consequence the resonator is much less sensitive to thermal and mechanical instabilities. Because of the manner in which the pump beam is reflected back and forth, there is little, if any, pump power being reflected from the sidewalls of the resonator, but on the other hand it is being reflected in such a manner that it is again fed out of the input laser mirror where it can be used not only for alignment purposes and monitoring laser operation, but can be used again as a pump source either for the same laser or another laser system which is operating independently.

As to the latter uses, reference is now made to FIGS. 5 and 6. As shown in FIG. 5, the emergent pump beam $30'$ is utilized to pump a second laser system designated by reference number 50 by being externally reflected, for example, by means of the mirrors 52 and 54 where it is injected as the pump beam $30''$ into the injection hole 56 of the end mirror 58 whereupon the same type of pumping action as described above takes place.

As to the configuration shown in FIG. 6, the emergent pump beam $30'$ is used as a second pump source for the laser 10 by being reinjected into the cavity resonator as beam $30''$ by being reflected off of external mirrors 60 and 62 and directed back to the injection hole 24 (FIG. 2A) at an angle which is still offset from the central axis of the cavity housing 20.

Having thus shown and described what is at present considered to be the preferred embodiments of the subject invention, it should be understood that all modifications and alterations coming within the spirit and scope of the invention as defined by the appended claims are meant to be included.

I claim:

1. A coherent optically pumped laser system having controlled propagation of a pump beam, comprising:
    cavity resonator means (10) including optical reflector means (12, 14) at each end of a resonator body (20) for providing multiple round trips of an injected pump beam (30) for exciting a laser medium contained in said resonator body (20) and thereby produce an output laser beam (25);
    offset means (24) in one of said reflector means (12) for providing injection of said pump beam (30) at a location offset from the central axis (22) of said resonator body (20);
    means (32) for injecting said pump beam (30) through said offset means (24) at a first angle ($\alpha$) with respect to said central axis whereby following a predetermined number of round trips of said pump beam in said resonator body said pump beam emerges from said offset means as a beam ($30'$) skewed at a second angle ($\beta$) with respect to said injected pump beam (30) so that no overlap of the beam vertices occur at said offset means (24) and pump beam feedback is thereby eliminated; and
    means (32) located external to said resonator means for receiving and utilizing the emergent pump beam ($30'$) for a selected purpose.

2. The system as defined by claim 1 wherein said cavity resonator means (10) comprises a degenerate cavity (12, 14, 20) including a gaseous laser medium.

3. The system as defined by claim 1 wherein said optical reflector means (12, 14) comprises end mirrors including curved inner faces (16, 18) having radii of predetermined dimensions with respect to the length of said resonator body (20) to provide a degenerate cavity.

4. The system as defined by claim 3 wherein said degenerate cavity (12, 14, 20) is configured to provide at least a fourfold degeneracy whereby four round trips of said pump beam (30) occur in said resonator body (20).

5. The system as defined by claim 1 wherein said pump beam comprises a laser beam (30) of a first wavelength which coherently pumps by resonate absorption pumping said laser medium to produce an output laser beam (25) of a second wavelength.

6. The system as defined by claim 5 wherein said first wavelength comprises a laser line of $CO_2$.

7. The system as defined by claim 5 wherein said second wavelength is in the far infrared (FIR) range of the optical spectrum.

8. The system as defined by claim 1 wherein said receiving means (32) located external to said resonator means (10) comprises means operable to detect and monitor a parameter of the emergent pump beam (30').

9. The system as defined by claim 8 wherein said means to detect and monitor a parameter comprises means (32) placed in the path of the emergent pump beam (30') to detect and monitor power.

10. The system as defined by claim 9 wherein said means to detect and monitor power comprises a power meter (32) which is used as alignment means for said resonator means (12, 14, 20).

11. The system as defined by claim 9 wherein said means to detect and monitor power comprises a power meter (32) wich is used for monitoring the operational performance of said system.

12. The system as defined by claim 9 wherein said means to detect and monitor power comprises a power meter (32) which is used for monitoring the power of said output laser beam (30') by observing the power absorption characteristic of the emergent pump beam.

13. The system as defined by claim 1 wherein said means located external to said resonator means comprises means (52, 54) for optically pumping another laser (50).

14. The system as defined by claim 1 wherein said receiving means located external to said resonator means comprises means (60, 62) for reinjecting the emergent pump beam (30') back through said offset means (24) as a second pump beam (30'').

* * * * *